United States Patent
Nishiyama

(10) Patent No.: US 12,173,846 B2
(45) Date of Patent: Dec. 24, 2024

(54) METHOD FOR MANUFACTURING HIGH-PRESSURE TANK, HIGH-PRESSURE TANK MANUFACTURING APPARATUS, AND NON-TRANSITORY STORAGE MEDIUM

(71) Applicant: TOYOTA JIDOSHA KABUSHIKI KAISHA, Toyota (JP)

(72) Inventor: Tomohiko Nishiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 274 days.

(21) Appl. No.: 17/654,809

(22) Filed: Mar. 14, 2022

(65) Prior Publication Data

US 2022/0299161 A1    Sep. 22, 2022

(30) Foreign Application Priority Data

Mar. 16, 2021  (JP) .................. 2021-042902

(51) Int. Cl.
| | | |
|---|---|---|
| *B29C 70/34* | (2006.01) | |
| *B29C 70/44* | (2006.01) | |
| *F17C 1/06* | (2006.01) | |
| *B29L 31/00* | (2006.01) | |

(52) U.S. Cl.
CPC .............. *F17C 1/06* (2013.01); *B29C 70/345* (2013.01); *B29C 70/443* (2013.01); *B29L 2031/7156* (2013.01); *F17C 2201/0109* (2013.01); *F17C 2203/0604* (2013.01); *F17C 2209/2154* (2013.01)

(58) Field of Classification Search
CPC ............ B29C 45/00; B29C 70/34; F17C 1/06
See application file for complete search history.

(56) References Cited

U.S. PATENT DOCUMENTS

| | | | | |
|---|---|---|---|---|
| 5,499,739 A | * | 3/1996 | Greist, III | ................ F17C 1/06 138/30 |
| 5,758,796 A | * | 6/1998 | Nishimura | ................ F17C 1/06 220/651 |
| 2002/0029449 A1 | * | 3/2002 | Portmann | ............. B29C 70/088 29/243.518 |
| 2003/0005933 A1 | * | 1/2003 | Izuchukwu | ................ F17C 1/02 128/205.24 |
| 2005/0006393 A1 | * | 1/2005 | Carter | ................... B29C 70/086 220/581 |

(Continued)

FOREIGN PATENT DOCUMENTS

| | | |
|---|---|---|
| CN | 101017788 A | 8/2007 |
| CN | 109986808 A | 7/2019 |

(Continued)

*Primary Examiner* — Andrew D Graham
(74) *Attorney, Agent, or Firm* — Hunton Andrews Kurth LLP

(57) ABSTRACT

A method for manufacturing a high-pressure tank includes an arrangement step of arranging, in a cavity of a mold, an intermediate including a liner and a fiber bundle wound around the liner, and an impregnation step of impregnating the fiber bundle with a molten resin in the cavity by increasing a pressure on the molten resin injected into the cavity. The impregnation step includes a pressure increasing step of increasing an internal pressure of the intermediate when increasing the pressure on the molten resin.

7 Claims, 4 Drawing Sheets

(56) References Cited

U.S. PATENT DOCUMENTS

| | | | |
|---|---|---|---|
| 2007/0065538 A1* | 3/2007 | Weatherall | B29C 45/52 425/568 |
| 2007/0181903 A1 | 8/2007 | Takakura | |
| 2009/0134244 A1* | 5/2009 | Sochtig | B29B 7/7642 239/533.1 |
| 2010/0075200 A1* | 3/2010 | Hatta | B29C 45/1615 220/586 |
| 2011/0108441 A1* | 5/2011 | Emori | F17C 1/06 206/0.6 |
| 2012/0024746 A1* | 2/2012 | Otsubo | B29C 63/10 156/187 |
| 2013/0049256 A1* | 2/2013 | Tani | F17C 1/06 264/249 |
| 2013/0186597 A1* | 7/2013 | Clark | F28D 15/00 165/157 |
| 2014/0014667 A1* | 1/2014 | Flammer | B29C 45/14786 156/172 |
| 2015/0274006 A1* | 10/2015 | Chung | B29D 22/003 264/46.7 |
| 2016/0114521 A1* | 4/2016 | Palvoelgyi | B29C 49/20 264/523 |
| 2017/0191618 A1* | 7/2017 | Kloft | B29C 70/86 |
| 2017/0241591 A1* | 8/2017 | Nishibu | F17C 1/06 |
| 2017/0276294 A1* | 9/2017 | Almagro | F17C 1/06 |
| 2017/0343158 A1* | 11/2017 | Kato | F17C 1/06 |
| 2018/0202606 A1* | 7/2018 | Hioki | B29C 70/16 |
| 2018/0238491 A1* | 8/2018 | Imai | B29C 49/20 |
| 2018/0292049 A1* | 10/2018 | Zhao | F17C 1/16 |
| 2019/0152169 A1* | 5/2019 | Volpato | B29C 70/548 |
| 2019/0195429 A1* | 6/2019 | Ueda | B29C 70/32 |
| 2019/0242525 A1* | 8/2019 | Criel | B29C 66/72141 |
| 2020/0269528 A1* | 8/2020 | Bouwmeester | B32B 38/08 |
| 2021/0237338 A1* | 8/2021 | Nishiyama | B29C 63/0004 |
| 2022/0072742 A1* | 3/2022 | Olhagaray | B29C 70/548 |

FOREIGN PATENT DOCUMENTS

| | | |
|---|---|---|
| EP | 3702155 A1 | 9/2020 |
| JP | 2010064392 A | 3/2010 |
| JP | 2017096334 A | 6/2017 |
| JP | 2018187775 A | 11/2018 |
| JP | 2019142118 A | 8/2019 |
| JP | 2019152310 A | 9/2019 |
| JP | 2020175564 A | 10/2020 |
| WO | 2020120895 A1 | 6/2020 |

* cited by examiner

METHOD FOR MANUFACTURING HIGH-PRESSURE TANK, HIGH-PRESSURE TANK MANUFACTURING APPARATUS, AND NON-TRANSITORY STORAGE MEDIUM

CROSS-REFERENCE TO RELATED APPLICATION

This application claims priority to Japanese Patent Application No. 2021-042902 filed on Mar. 16, 2021, incorporated herein by reference in its entirety.

BACKGROUND

1. Technical Field

This specification discloses a high-pressure tank manufacturing apparatus, a method for manufacturing a high-pressure tank and a non-transitory storage medium.

2. Description of Related Art

Japanese Unexamined Patent Application Publication No. 2019-152310 (JP 2019-152310 A) discloses a method for manufacturing a high-pressure tank. In this manufacturing method, a fiber bundle is impregnated with a resin by filling a mold with the resin and pressurizing the resin. An intermediate obtained by winding the fiber bundle around a liner is arranged in the mold.

SUMMARY

When the resin is pressurized, it is appropriate that an internal pressure of the intermediate be increased in advance to suppress the intermediate from being deformed under the pressure on the resin. When the internal pressure of the intermediate is excessively high, however, the liner may expand and the fiber bundle may be misaligned.

This specification provides a technology for suppressing the deformation of the intermediate due to the increased pressure on the resin without presetting a high internal pressure for the intermediate.

This specification discloses a method for manufacturing a high-pressure tank. A first aspect of the present disclosure relates to a method for manufacturing a high-pressure tank. The method includes an arrangement step of arranging, in a cavity of a mold, an intermediate including a liner and a fiber bundle wound around the liner, and an impregnation step of impregnating the fiber bundle with a molten resin in the cavity by increasing a pressure on the molten resin injected into the cavity. The impregnation step includes a pressure increasing step of increasing an internal pressure of the intermediate when increasing the pressure on the molten resin.

This specification discloses a high-pressure tank manufacturing apparatus. A second aspect of the present disclosure relates to a high-pressure tank manufacturing apparatus including a mold having a cavity where an intermediate including a liner and a fiber bundle wound around the liner is arranged, an injection mechanism configured to inject a molten resin into the cavity and increase a pressure on the molten resin, and a pressure increasing mechanism configured to increase an internal pressure of the intermediate arranged in the cavity when increasing the pressure on the molten resin.

In the manufacturing method and the manufacturing apparatus described above, the internal pressure of the intermediate is increased when increasing the pressure on the molten resin. According to this structure, the internal pressure of the intermediate need not be preset high. As a result, it is possible to reduce the occurrence of a case where the liner is deformed and the fiber bundle is misaligned. By increasing the internal pressure of the intermediate when increasing the pressure on the molten resin, it is possible to suppress deformation of the intermediate due to the increase in the pressure on the molten resin.

This specification discloses a non-transitory storage medium storing instructions for a high-pressure tank manufacturing apparatus. The high-pressure tank manufacturing apparatus includes a mold provided with a cavity where an intermediate including a liner and a fiber bundle wound around the liner is arranged, an injection mechanism configured to inject a molten resin into the cavity and increase a pressure on the molten resin, a pressure increasing mechanism configured to increase an internal pressure of the intermediate arranged in the cavity while increasing the pressure on the molten resin, and one or more processors configured to control at least one of the injection mechanism and the pressure increasing mechanism. A third aspect of the present disclosure relates to the non-transitory storage medium storing instructions that are executable by the one or more processors and that cause the one or more processors to perform functions including controlling an increase in at least one of the internal pressure of the intermediate and the pressure on the molten resin in the cavity when increasing the pressure on the molten resin in the cavity.

According to this structure, the increase in at least one of the internal pressure of the intermediate and the pressure on the molten resin in the cavity is controlled when increasing the pressure on the molten resin. Thus, when increasing the pressure on the molten resin, the balance between the internal pressure of the intermediate and the pressure on the molten resin in the cavity can be maintained without presetting a high internal pressure for the intermediate. As a result, it is possible to reduce the occurrence of a case where the liner is deformed and the fiber bundle is misaligned, and to suppress the deformation of the intermediate.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
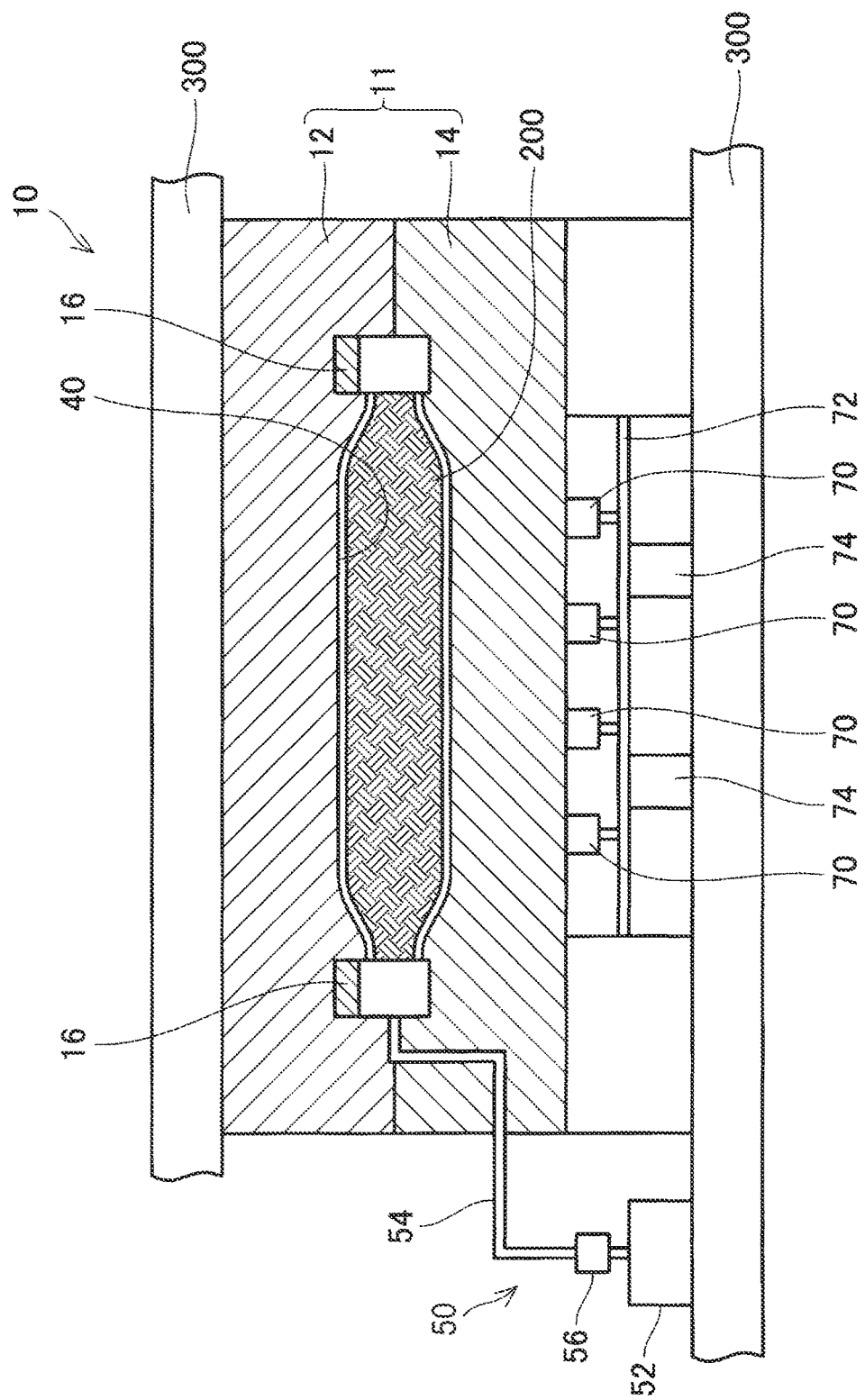
FIG. 1 is a vertical sectional view of a high-pressure tank manufacturing apparatus according to an embodiment.

Technical elements disclosed herein are described below. The following technical elements are useful independently.

An impregnation step may include a pressure control step of controlling an increase in a pressure on a molten resin in a cavity. In a pressure increasing step, an internal pressure of an intermediate may be increased in response to the controlled increase in the pressure on the molten resin.

According to this structure, the pressure on the molten resin can be increased in association with the increase in the internal pressure of the intermediate by controlling the increase in the pressure on the molten resin. It is possible to appropriately reduce the occurrence of a case where the intermediate is deformed due to the increase in the pressure on the molten resin.

In the pressure control step, at least one of a force for pressing the molten resin and a flow rate of the molten resin flowing into the cavity per unit time may be controlled.

By controlling at least one of the force for pressing the molten resin and the flow rate of the molten resin flowing into the cavity per unit time, the pressure on the molten resin flowing into the cavity can be increased in association with the internal pressure of the intermediate.

In an arrangement step, the internal pressure of the intermediate may be an initial internal pressure. In the impregnation step, a pressure difference between the internal pressure of the intermediate and the pressure on the molten resin in the cavity may be equal to or higher than the initial internal pressure until the molten resin is cured.

It has been found that, in the process of increasing the pressure on the molten resin, the pressure on the molten resin abruptly increases immediately after the cavity is filled with the molten resin. By keeping the pressure difference between the internal pressure of the intermediate and the pressure on the molten resin in the cavity to be equal to or higher than the initial internal pressure of the intermediate, it is possible to avoid a situation in which the pressure on the molten resin exceeds the internal pressure of the intermediate due to the abrupt increase in the pressure on the molten resin. As a result, it is possible to suppress the deformation of the intermediate due to the pressure on the molten resin.

In the impregnation step, the pressure difference between the internal pressure of the intermediate and the pressure on the molten resin in the cavity may be equal to or lower than 2 MPa until the molten resin is cured.

According to this structure, it is possible to suppress the deformation of the intermediate due to the internal pressure because the pressure on the molten resin is excessively low.

A storage step may further be provided to store the molten resin in a storage space different from the cavity of the mold and communicating with the cavity. In the impregnation step, the molten resin stored in the storage space may be pushed out and injected into the cavity.

According to this structure, the pressure on the molten resin in the cavity can be controlled more easily than a case where the molten resin outside the mold is directly injected into the cavity.

The mold may have a storage space communicating with the cavity. An injection mechanism may include a piston configured to push out, into the cavity, the molten resin stored in the storage space, and an actuator configured to move the piston.

According to this structure, the pressure on the molten resin in the cavity can be controlled by controlling the piston by the actuator.

The actuator may include a servomotor.

According to this structure, the movement of the piston can finely be controlled by the servomotor. Thus, the pressure on the molten resin in the cavity can be controlled easily.

The injection mechanism may include a controller configured to control at least one of a force for injecting the molten resin into the cavity and a flow rate of the molten resin flowing into the cavity per unit time.

By controlling at least one of the force for injecting the molten resin into the cavity and the flow rate of the molten resin flowing into the cavity per unit time, the pressure on the molten resin flowing into the cavity can be increased in association with the internal pressure of the intermediate.

A computer program for a high-pressure tank manufacturing apparatus may cause a computer of the high-pressure tank manufacturing apparatus to control the pressure on the molten resin by controlling at least one of the force for pressing the molten resin and the flow rate of the molten resin flowing into the cavity per unit time when increasing the pressure on the molten resin in the cavity.

By controlling at least one of the force for injecting the molten resin into the cavity and the flow rate of the molten resin flowing into the cavity per unit time, the pressure on the molten resin flowing into the cavity can be increased in association with the internal pressure of the intermediate.

The computer program for the high-pressure tank manufacturing apparatus may cause the computer of the high-pressure tank manufacturing apparatus to control the pressure on the molten resin by controlling at least one of the force for pressing the molten resin in the cavity and the flow rate of the molten resin flowing into the cavity per unit time at intervals of 0.5 seconds or shorter while increasing the pressure on the molten resin in the cavity.

According to this structure, the pressure on the molten resin can be increased in association with the increase in the internal pressure of the intermediate by finely controlling the pressing force on the molten resin and the inflow rate.

First Embodiment

As illustrated in FIG. 1, a high-pressure tank manufacturing apparatus 10 of this embodiment is used for manufacturing a high-pressure tank 100.

Structure of High-Pressure Tank

Figure 4:
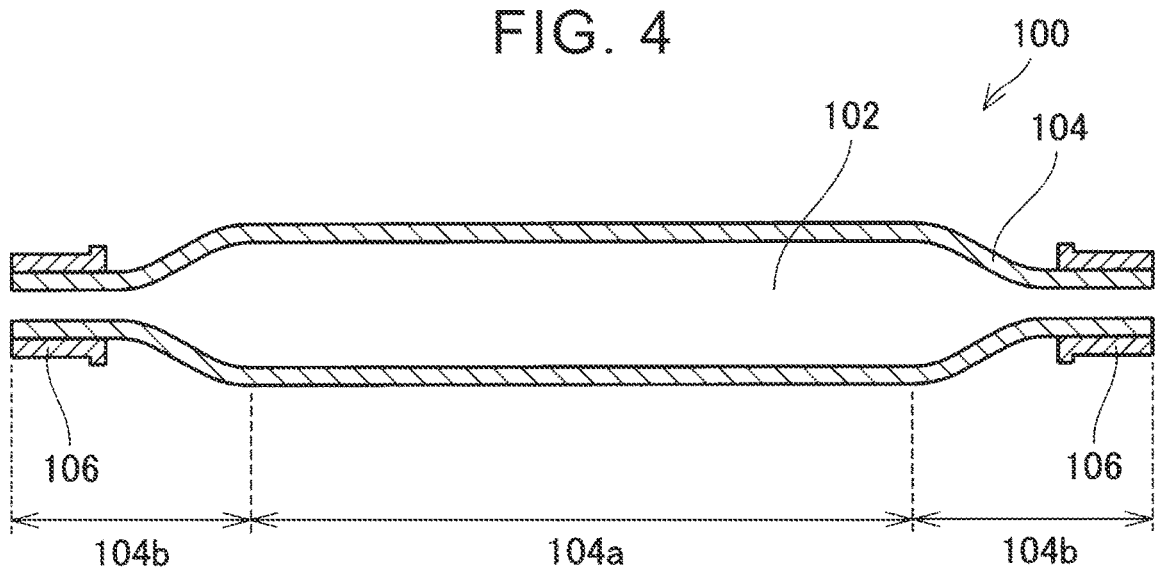
FIG. 4 is a vertical sectional view of a high-pressure tank according to the embodiment.

First, the high-pressure tank 100 will be described with reference to FIG. 4. The high-pressure tank 100 is mounted on a fuel cell vehicle and stores fuel gas such as natural gas or hydrogen gas. The high-pressure tank 100 includes a liner 102, a fiber bundle 104 impregnated with a resin, and annular members 106. The liner 102 is made of a gas barrier resin material. The liner 102 has a cylindrical shape at a central portion 104a. Each tip portion 104b of the liner 102 is gradually tapered away from the central portion 104a toward the end of the liner 102.

The fiber bundle 104 is arranged on the outer surface of the liner 102. The fiber bundle 104 is formed by winding carbon fibers around the outer surface of the liner 102. The fiber bundle 104 is arranged over the entire length of the liner 102. The carbon fibers of the fiber bundle 104 are wound by braiding.

The fiber bundle 104 is sandwiched and held by the liner 102 and the annular members 106 at both ends of the high-pressure tank 100. The high-pressure tank manufacturing apparatus 10 is used to impregnate a resin into the fiber bundle 104 of an intermediate 200 including the fiber bundle 104 wound around the liner 102 and held by the annular members 106. Therefore, the high-pressure tank manufacturing apparatus 10 may be referred to also as "impregnation apparatus". In a modified example, the application of the high-pressure tank 100 is not limited to the storage of the fuel gas of the fuel cell vehicle, and may be storage of a high-pressure gas with the same structure as that described above.

Structure of High-Pressure Tank Manufacturing Apparatus

Figure 2:
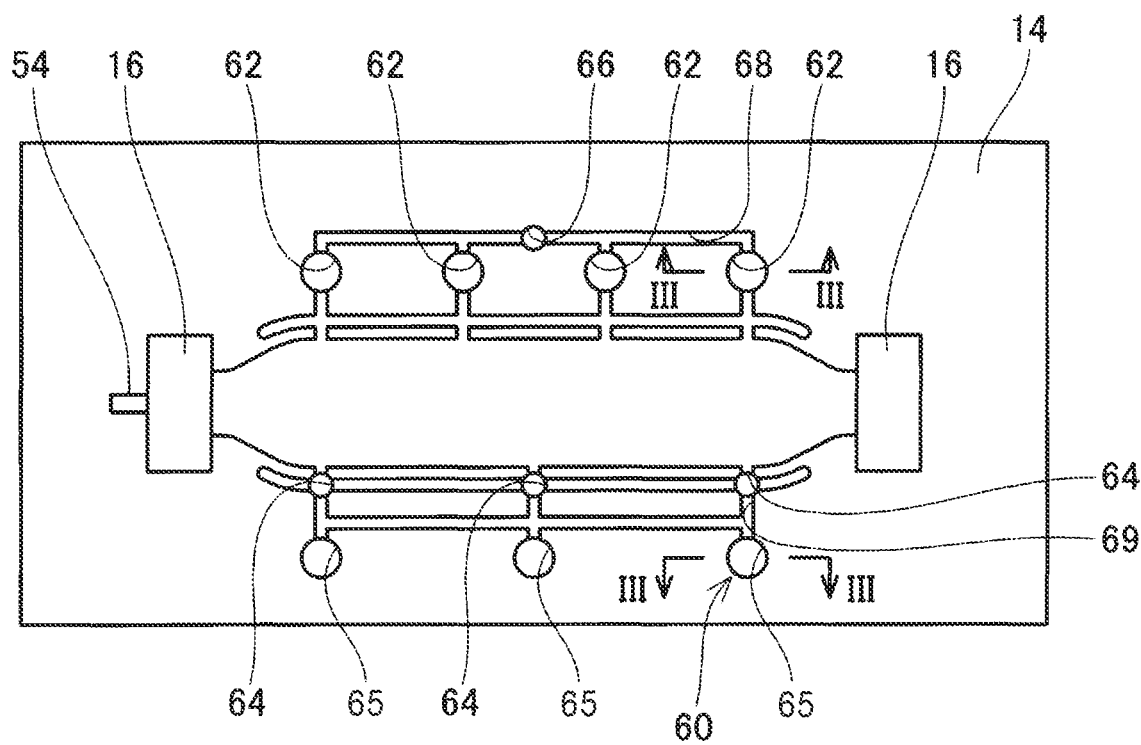
FIG. 2 is a plan of a lower die of the embodiment as viewed from the top.

As illustrated in FIGS. 1 and 2, the high-pressure tank manufacturing apparatus 10 includes a mold 11, a pressure increasing mechanism 50, and an injection mechanism 60. The mold 11 includes an upper die 12 and a lower die 14. When the upper die 12 and the lower die 14 are closed, a cavity 40 is formed in the mold 11. The intermediate 200 is arranged in the cavity 40. The cavity 40 is a space slightly larger than the outer shape of the intermediate 200. Therefore, when the intermediate 200 is arranged in the cavity 40, a small clearance is secured between the cavity 40 and the intermediate 200 so that a molten resin can flow. In FIG. 1, a large clearance is drawn between the cavity 40 and the intermediate 200 for visibility.

As illustrated in FIG. 1, the pressure increasing mechanism 50 is attached to the mold 11. The pressure increasing mechanism 50 increases an internal pressure of the intermediate 200 arranged in the mold 11. The pressure increasing mechanism 50 includes a gas cylinder 52, a communication pipe 54, and a valve device 56. The gas cylinder 52 stores gas such as nitrogen gas to be injected into the liner 102. The communication pipe 54 communicates with the inside of the intermediate 200 arranged in the cavity 40 to communicate the inside of the intermediate 200 with the gas cylinder 52. The valve device 56 adjusts the amount of nitrogen flowing from the gas cylinder 52 to the inside of the intermediate 200 by opening or closing the communication pipe 54. The valve device 56 is manually controlled by an operator.

As illustrated in FIG. 2, the injection mechanism 60 is arranged in the lower die 14. The injection mechanism 60 injects a molten resin into the cavity 40. The injection mechanism 60 includes an injection port 66, a plurality of storage spaces 62, 64, and 65, resin channels 68 and 69, a plurality of pistons 70, servomotors 74, and a control device 80 (see FIG. 3). The injection port 66 is open on the upper surface of the lower die 14. The injection port 66 communicates with a reservoir arranged outside the lower die 14 via a through hole formed in the lower die 14. The molten resin is stored in the reservoir.

The injection port 66 is connected to the resin channel 68. The resin channel 68 has a groove shape on the upper surface of the lower die 14. The resin channel 68 extends to the storage spaces 62 arranged closer to the injection port 66 with respect to the cavity 40. As a result, the injection port 66 and each of the storage spaces 62 communicate with each other. The resin channel 68 further extends from the storage spaces 62 to the cavity 40. As a result, each of the storage spaces 62 and the cavity 40 communicate with each other. Each of the storage spaces 62 is a circular tube-shaped hole extending downward from the upper surface of the lower die 14. The storage spaces 62 have the same shape.

Figure 3:
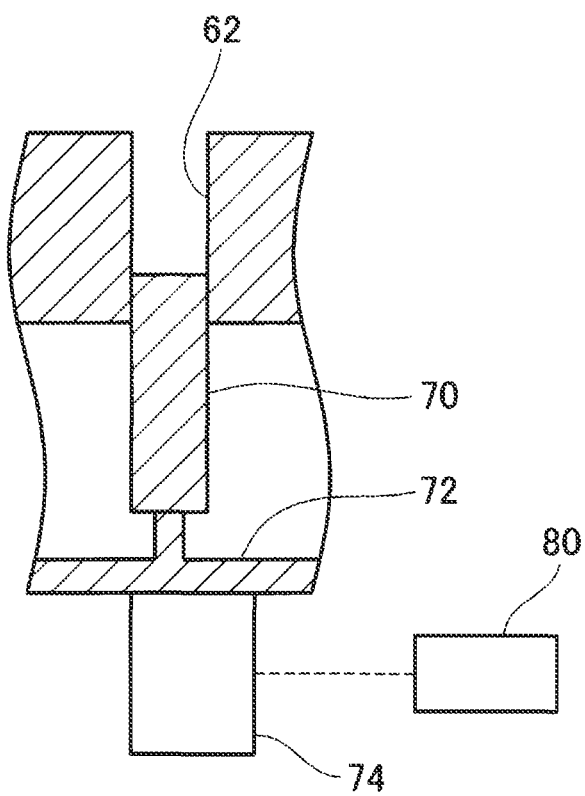
FIG. 3 is a vertical sectional view of a piston according to the embodiment.

As illustrated in FIG. 3, the piston 70 is arranged in each of the storage spaces 62. The piston 70 is movable in a vertical direction in the storage space 62. The piston 70 has a clearance from the peripheral wall of the storage space 62 so that the molten resin does not flow into the clearance. The piston 70 is attached to the servomotors 74 via a flat support plate 72. The servomotor 74 is controlled by the control device 80. The control device 80 includes a central processing unit (CPU) and a memory. A computer program for the CPU is prestored in the memory. The control device 80 controls a torque of the servomotor 74 and a moving speed of the piston 70 based on the computer program. In this embodiment, four servomotors 74 are arranged but the number of servomotors may be one, two, or more.

The pistons 70 arranged in the storage spaces 62 are attached to one support plate 72. As a result, the pistons 70 are moved in the vertical direction by one support plate 72 that is moved in the vertical direction by the servomotors 74.

The resin channel 69 is arranged on the upper surface of the lower die 14 opposite to the injection port 66 across the cavity 40. The resin channel 69 has a groove shape similarly to the resin channel 68. The resin channel 69 extends from the cavity 40 to the storage spaces 64 and 65. As a result, the cavity 40 and each of the storage spaces 64 and 65 communicate with each other. Each of the storage spaces 65 has the same shape as that of the storage space 62. The storage spaces 64 are cylindrical holes having a smaller hole diameter than those of the storage spaces 62 and 65. Similarly to the storage space 62, the piston 70 is arranged in each of the storage spaces 64 and 65. The pistons 70 in the storage spaces 64 and 65 are attached to the same support plate 72 as that of the pistons 70 in the storage spaces 62.

Method for Manufacturing High-Pressure Tank

Figure 5:
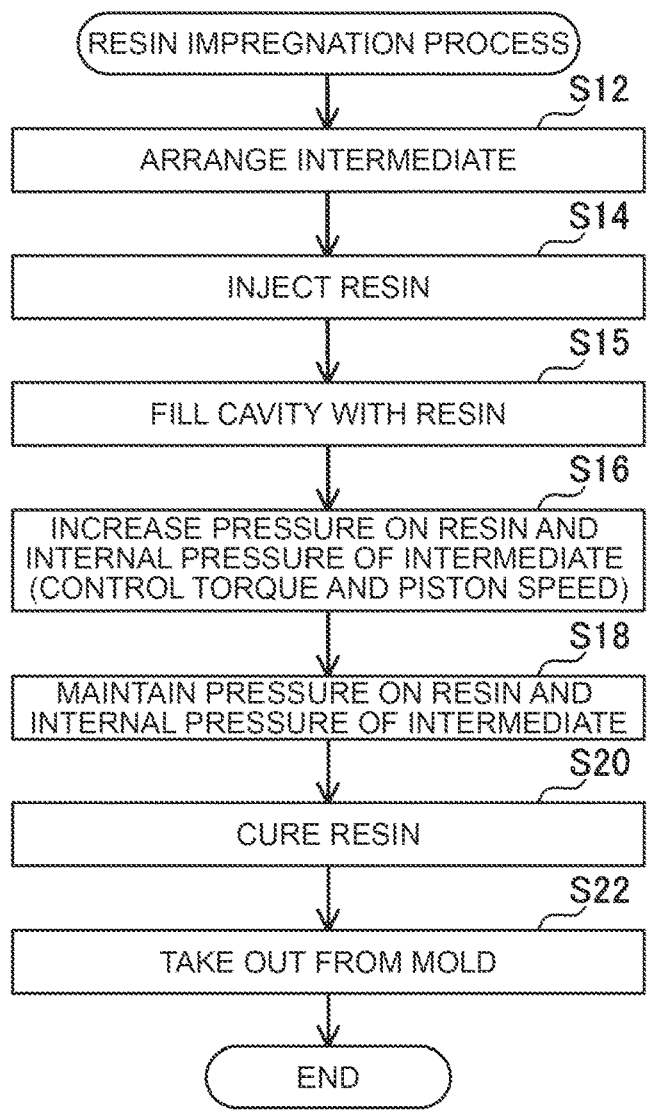
FIG. 5 is a flowchart illustrating a method for manufacturing the high-pressure tank according to the embodiment.

Next, a method for manufacturing the high-pressure tank 100 will be described with reference to FIGS. 5 and 6. In this manufacturing method, the intermediate 200 is first manufactured by arranging the fiber bundle 104 on the liner 102 and holding the fiber bundle 104 by the annular members 106. Next, a resin impregnation process is performed to impregnate the fiber bundle 104 with a resin. In the resin impregnation process, so-called resin transfer molding (RTM) is performed. In the RTM, the fiber bundle 104 is impregnated with the resin by injecting the resin into the cavity 40 where the intermediate 200 is arranged and pressurizing the resin in the mold 11 attached to equipment 300 (for example, a press).

In the resin impregnation process, the upper die 12 and the lower die 14 of the mold 11 are separated from each other, the intermediate 200 is arranged in a portion shaped as the cavity 40 in the lower die 14, and the intermediate 200 is fixed by supports 16 (S12). The communication pipe 54 of the pressure increasing mechanism 50 is attached to the intermediate 200 at its one end, and the communication pipe 54 communicates with the inside of the intermediate 200. Next, the upper die 12 and the lower die 14 are closed.

Next, a molten resin is injected into the storage spaces 62, 64, and 65 from the injection port 66 (S14). Examples of the resin to be injected include an epoxy resin. Before the process of S14, the pistons 70 in the storage spaces 62, 64, and 65 are arranged at lower limit positions. The molten resin that has flowed into the mold 11 from the injection port 66 passes through the resin channel 68, and flows into and fills the storage spaces 62. The molten resin passes through the clearance between the surface of the cavity 40 and the intermediate 200 from the resin channel 68, and flows into the resin channel 69. The molten resin flowing through the resin channel 69 flows into and fills the storage spaces 64 and 65.

In S15, the control device 80 drives the servomotors 74 to raise the pistons 70, thereby pressing the molten resin stored in the storage spaces 62, 64, and 65 and filling the cavity 40 with the molten resin. In S16, the control device 80 causes the servomotors 74 to press the pistons 70 upward, thereby increasing the pressure on the molten resin in the cavity 40. As a result, the resin starts to be impregnated into the fiber bundle 104. In S16, the operator operates the valve device 56 to introduce gas from the gas cylinder 52 into the intermediate 200 via the communication pipe 54. As a result, the internal pressure of the intermediate 200 is increased. In S15 and S16, the control device 80 controls the servomotors 74 by using upper limit values of the torque and the ascending speed of the servomotors 74 preset by the computer program.

When the pressure on the molten resin in the cavity 40 and the internal pressure of the intermediate 200 are increased to predetermined pressure values in S16, the pressure on the molten resin in the cavity 40 and the internal pressure of the intermediate 200 are maintained in S18. When the pressure on the molten resin is maintained and the impregnation proceeds, the molten resin is cured gradually. After the resin is cured (S20), the upper die 12 and the lower die 14 are separated from each other, and the molded high-pressure tank 100 is taken out from the mold 11 (S22) to complete the resin impregnation process.

Description of Internal Pressure of Intermediate and Pressure on Molten Resin in S14 to S18

Figure 6:
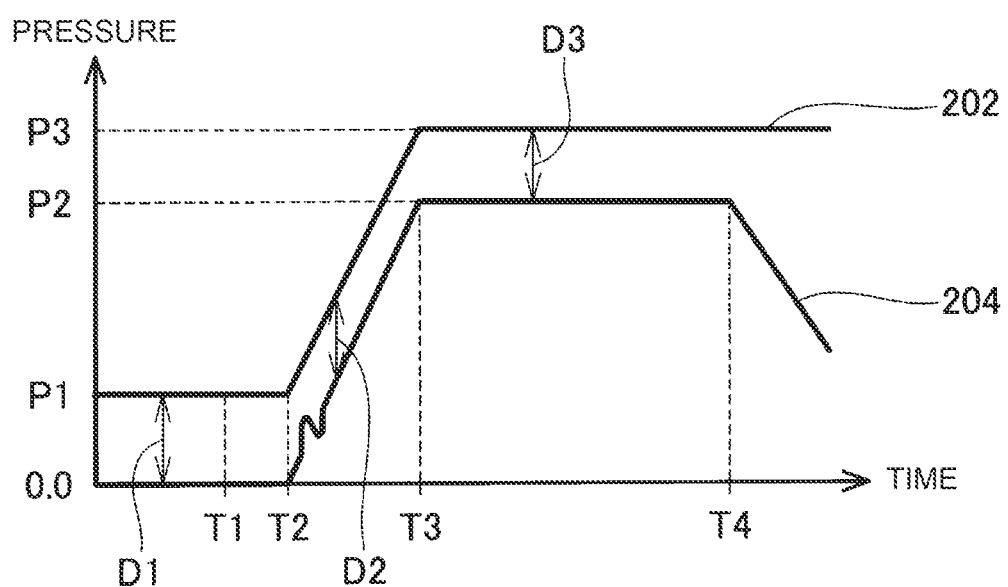
FIG. 6 is a graph illustrating an internal pressure of an intermediate and a pressure on a molten resin according to the embodiment.

Referring to FIG. 6, description is given of an internal pressure 202 of the intermediate 200 and a pressure 204 on the molten resin in the cavity 40 in the process from the injection of the molten resin into the mold 11 to the curing of the molten resin. The internal pressure 202 and the pressure 204 in FIG. 6 are schematic representations of an actual internal pressure of the intermediate 200 and an actual pressure on the molten resin for description of a tendency of pressure changes.

An internal pressure P1 is applied in advance to the intermediate 200 arranged in the mold 11. The pressure P1 is applied to maintain the shape of the intermediate 200, and is, for example, 0.7 MPa. At a stage where the molten resin is stored in the storage spaces 62, 64, and 65 in S14, the molten resin is introduced so that a pressure on the molten resin passing through the cavity 40 is equal to a pressure in the cavity 40 before the molten resin flows into the cavity 40 (0.0 MPa in FIG. 6) as shown in a period up to a timing T1. At the stage of S14, the pistons 70 are not moved from the lower limit positions.

In S15, the control device 80 controls the servomotors 74 to raise the pistons 70, thereby pressing the molten resin stored in the storage spaces 62, 64, and 65. As a result, the molten resin flows into the cavity 40. In S15, the internal pressure 202 of the intermediate 200 and the pressure 204 on the molten resin in the cavity 40 do not change as shown in a period from the timing T1 to a timing T2. In the period up to the timing T2, a pressure difference between the internal pressure 202 of the intermediate 200 and the pressure 204 on the molten resin in the cavity 40 is maintained to be a pressure difference D1. During this period, the control device 80 controls the servomotors 74 to keep the servomotors 74 at a torque N1 and keep the upper limit of the ascending speed of each piston 70 at a speed V1. As a result, the control device 80 maintains a constant force for pressing the molten resin, and determines the upper limit of the flow rate of the molten resin flowing into the cavity 40 per unit time.

In S16, the pressure 204 on the molten resin in the cavity 40 is increased to a pressure P2 and the internal pressure 202 of the intermediate 200 is increased from the pressure P1 to a pressure P3 as shown in a period from the timing T2 to a timing T3. During the period from the timing T2 to the timing T3, the control device 80 gradually increases the torque of the servomotors 74 from the torque N1. For example, when the period from the timing T2 to the timing T3 is 15 seconds and the pressure 204 on the molten resin in the cavity 40 and the internal pressure 202 of the intermediate 200 are increased to the predetermined pressures P2 and P3 in S16, respectively, the control device 80 gradually increases the torque of the servomotors 74 from the torque N1 at intervals of 0.1 seconds to reach a torque N2 in 15 seconds. The torque N2 is a torque for bringing the pressure 204 on the molten resin in the cavity 40 to the pressure P2. The torque is constantly increased every 0.1 seconds. As a result, the control device 80 gradually increases the pressing force applied to the molten resin in the cavity 40.

During this period, the control device 80 keeps the upper limit of the ascending speed of each piston 70 at a speed V2 lower than the speed V1. As a result, the control device 80 determines the upper limit of the flow rate of the molten resin flowing into the cavity 40 per unit time.

In an initial stage of pressurization of the molten resin, the pressure on the molten resin abruptly increases when the cavity 40 is filled with the molten resin and the impregnation is started. According to the structure described above, it is possible to suppress the increase in the pressure on the molten resin by controlling the pressing force to be applied to the molten resin and the flow rate of the molten resin flowing into the cavity 40 per unit time. During the period from the timing T2 to the timing T3, a pressure difference D2 between the internal pressure 202 of the intermediate 200 and the pressure 204 on the molten resin in the cavity 40 in the pressure increasing step is kept equal to or higher than the pressure difference D1. The pressure difference D2 is suppressed to be 2.0 MPa or lower. As a result, it is possible to reduce the occurrence of a case where the intermediate 200 expands and the fiber bundle 104 is misaligned because the internal pressure 202 of the intermediate 200 is excessively high.

In S18, the pressure 204 on the molten resin in the cavity 40 is kept at the pressure P2 and the internal pressure 202 of the intermediate 200 is kept at the pressure P3 as shown in a period from the timing T3 to a timing T4. During the period from the timing T3 to the timing T4, the control device 80 keeps the torque of the servomotors 74 at the torque N2. As a result, the pressing force applied to the molten resin in the cavity 40 is maintained.

During this period, the control device 80 stops the pistons 70. As a result, the upper limit of the flow rate of the molten resin flowing into the cavity 40 per unit time is determined. During the period from the timing T3 to the timing T4, a pressure difference D3 between the internal pressure 202 of the intermediate 200 and the pressure 204 on the molten resin in the cavity 40 in the pressure maintaining step is kept equal to or higher than the pressure difference D1 and equal to or lower than 2.0 MPa.

After the timing T4, the resin is cured and the pressure 204 is reduced. At this timing, the control device 80 lowers the pistons 70.

Effects

In this embodiment, the internal pressure of the intermediate 200 arranged in the cavity 40 is increased while the pressure on the molten resin is increased. According to this structure, the initial internal pressure of the intermediate 200 need not be preset high. As a result, it is possible to reduce the occurrence of a case where the liner 102 is deformed and the fiber bundle 104 is misaligned due to the internal pressure. By increasing the internal pressure of the intermediate 200 when the pressure on the molten resin is increased, it is possible to suppress the deformation of the intermediate 200 due to the increase in the pressure on the molten resin.

By controlling the pressure on the molten resin when the pressure on the molten resin is increased, the balance between the internal pressure of the intermediate 200 and the pressure on the molten resin in the cavity 40 can be maintained. As a result, it is possible to reduce the occurrence of a case where the liner 102 is deformed and the fiber bundle 104 is misaligned, and to suppress the deformation of the intermediate 200.

When the pressure on the molten resin is increased, the control device 80 controls the torque and the ascending speed of the servomotors 74 to control the force for pressing the molten resin and the flow rate of the molten resin flowing into the cavity 40 per unit time. As a result, the pressure on the molten resin flowing into the cavity 40 can be increased in association with the internal pressure of the intermediate 200.

The control device 80 increases the torque of the servomotors 74 in units of 0.1 seconds. The control device 80 determines the upper limit of the ascending speed of the servomotors 74. As a result, it is possible to suppress an abrupt change in the pressure on the molten resin. In this embodiment, the pressure 204 on the molten resin changes significantly in the initial stage of the period from the timing T2 to the timing T3. As the amount of change in the torque of the servomotors 74 increases, the degree of change in the pressure on the molten resin is greater than the change represented by the pressure 204.

In the resin impregnation step, the fiber bundle 104 needs to be impregnated with the molten resin before the molten resin starts to cure. Therefore, the period of the increase in the pressure on the molten resin is predetermined based on a curing rate of the molten resin. The pressure on the molten resin to be held for the impregnation, that is, the torque of the servomotors 74 to be increased is predetermined as well. When the torque of the servomotors 74 is increased in units of time longer than 0.1 seconds (for example, in units of 1.0 second), a larger amount of torque is increased per unit time. That is, the amount of change in the torque per unit time increases. In this embodiment, it has been found that the abrupt pressure change on the molten resin can be suppressed when the torque can be increased gradually in units of 0.5 seconds or shorter.

By keeping the pressure difference D2 equal to or higher than the initial pressure difference D1 in the process of increasing the pressure on the molten resin and the internal pressure of the intermediate 200, it is possible to avoid a situation in which the pressure on the molten resin exceeds the internal pressure of the intermediate 200 due to an abrupt change in the pressure on the molten resin. As a result, it is possible to suppress the deformation of the intermediate 200 due to the pressure on the molten resin. By keeping the pressure difference D2 at 2.0 MPa or lower, it is possible to suppress the deformation of the intermediate 200 due to the internal pressure because the pressure on the molten resin is excessively low.

In this embodiment, the molten resin injected into the mold 11 from the injection port 66 is temporarily stored in the storage spaces 62, 64, and 65 and then fills the cavity 40. According to this structure, the pressure on the molten resin in the cavity can be controlled more easily than a case where the molten resin from the injection port 66 directly fills the cavity 40.

The molten resin in the storage spaces 62, 64, and 65 is pushed out by the pistons 70 moved by the servomotors 74 to fill the cavity 40. As a result, the pressure on the molten resin in the cavity 40 can appropriately be controlled by finely controlling the movement of the pistons 70 by the servomotors 74.

Second Embodiment

In this embodiment, the control device 80 controls the valve device 56 together with the servomotors 74 based on a computer program. Specifically, the control device 80 opens the valve device 56 at the timing T2, and closes the valve device 56 at the timing T3. During the period from the timing T2 to the timing T3, the control device 80 keeps a constant opening degree of the valve device 56. In the period after the timing T3, the control device 80 closes the valve device 56. In a modified example, the control device 80 may change the opening degree of the valve device 56 depending on the pressure on the molten resin during the period from the timing T2 to the timing T3.

In a modified example, the control device 80 may control the opening and closing of the valve device 56 without controlling the force for pressing the molten resin and the flow rate of the molten resin flowing into the cavity 40 per unit time.

Although the embodiments of the present disclosure have been described above in detail, the embodiments are only illustrative and are not intended to limit the disclosure. The technologies disclosed herein encompass various modifications and changes to the specific examples described above.

(1) The pistons 70 may be moved by an actuator such as an air cylinder or a hydraulic cylinder in addition to the servomotors 74.

(2) The mold 11 need not have the storage spaces 62, 64, and 65. In this case, the molten resin may flow from the injection port 66 into the cavity 40 through the channel (for example, the resin channel 68).

(3) The control device 80 may control only one of the torque and the ascending speed of the servomotors 74. That is, the control device 80 may control only one of the force for pressing the molten resin and the flow rate of the molten resin flowing into the cavity 40 per unit time.

(4) The molten resin need not completely fill the storage spaces 62, 64, and 65. In this case, in an initial stage where the pistons 70 are raised, the control device 80 may control the servomotors 74 by setting a great torque for the servomotors 74 (for example, a maximum value) until the molten resin flows from the storage spaces 62, 64, and 65 toward the cavity 40. Thus, it is possible to shorten the period required to fill the cavity 40 with the molten resin from the storage spaces 62, 64, and 65.

(5) The control device 80 may control the servomotors 74 by feedback control. For example, the control device 80 may acquire values of an increasing internal pressure of the intermediate 200 and an increasing pressure on the molten resin from a sensor for measuring the internal pressure of the intermediate 200 and a sensor for measuring the pressure on the molten resin, and correct the torque and the upper limit speed of the servomotors 74 by using the acquired pressure values.

The technical elements described herein or illustrated in the drawings exhibit technical utility solely or in various combinations, and are not intended to limit the disclosure. The technologies described herein or illustrated in the drawings may simultaneously achieve a plurality of objects, and exhibit technical utility by achieving one of the objects.

What is claimed is:

1. A high-pressure tank manufacturing apparatus comprising:
a mold including a lower die and an upper die, wherein the lower die and the upper die together define a cavity where an intermediate including a liner and a fiber bundle wound around the liner is arranged;

an injection mechanism configured to inject a molten resin into the cavity and increase a pressure on the molten resin; and a pressure increasing mechanism configured to increase an internal pressure of the intermediate arranged in the cavity when the injection mechanism increases the pressure on the molten resin, wherein the lower die includes an injection port on an upper surface of the lower die, resin channels extending on the upper surface from the injection port to the cavity, a plurality of resin storage spaces provided in the resin channels, and the injection mechanism includes a plurality of pistons each disposed in each of the resin storage spaces and configured to press the molten resin stored in a corresponding resin storage space among the plurality of resin storage spaces to cause the molten resin to flow into the cavity, and an actuator configured to move the plurality of pistons.

2. The high-pressure tank manufacturing apparatus according to claim 1, wherein the actuator includes a servomotor.

3. The high-pressure tank manufacturing apparatus according to claim 2, wherein the injection mechanism includes a controller configured to control the servomotor to maintain a value of a torque of the servomotor to a first value during a first period, increase the value of the torque from the first value to a second value at intervals of 0.5 seconds or shorter during a second period after the first period, and maintain the value of the torque to the second value during a third period after the second period.

4. The high-pressure tank manufacturing apparatus according to claim 3, wherein the internal pressure of the intermediate at a time at which the intermediate is arranged in the cavity is defined as an initial internal pressure, and the controller is configured to control the servomotor such that a pressure difference between the internal pressure of the intermediate and the pressure on the molten resin in the cavity is equal to or higher than the initial internal pressure until the molten resin is cured.

5. The high-pressure tank manufacturing apparatus according to claim 3, wherein, the controller is configured to control the servomotor such that a pressure difference between the internal pressure of the intermediate and the pressure on the molten resin in the cavity is equal to or lower than 2 MPa until the molten resin is cured.

6. The high-pressure tank manufacturing apparatus according to claim 1, wherein each of the plurality of resin storage spaces is a circular-shaped hole extending downward from the upper surface of the lower die.

7. The high-pressure tank manufacturing apparatus according to claim 3, wherein the pressure increasing mechanism includes:

a gas cylinder;

a communication pipe communicating the gas cylinder and inside of the intermediate; and a valve device disposed at the communication pipe and configured to adjust an amount of gas flowing from the gas cylinder to the inside of the intermediate, wherein the controller is further configured to control opening and closing of the valve device.

* * * * *